Sept. 7, 1926.  
B. W. DECATUR  
1,598,713  
DEVICE FOR INDICATING AXLE DISTORTION  
Filed June 8, 1921   2 Sheets-Sheet 1
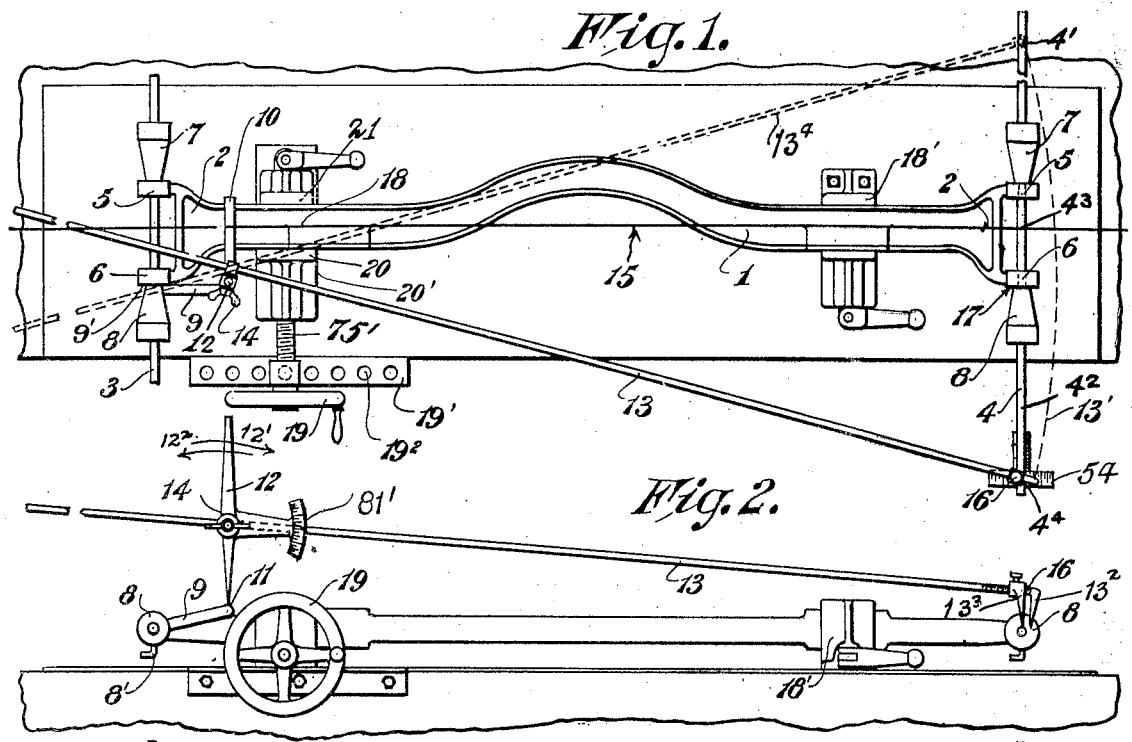
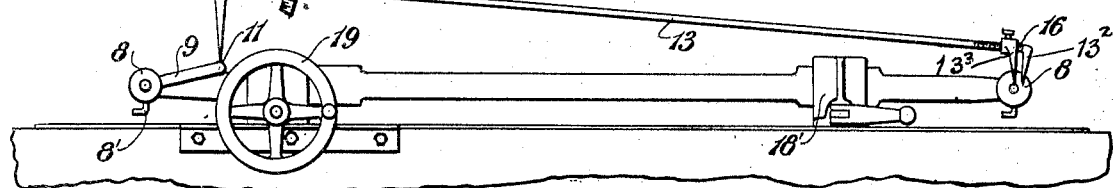
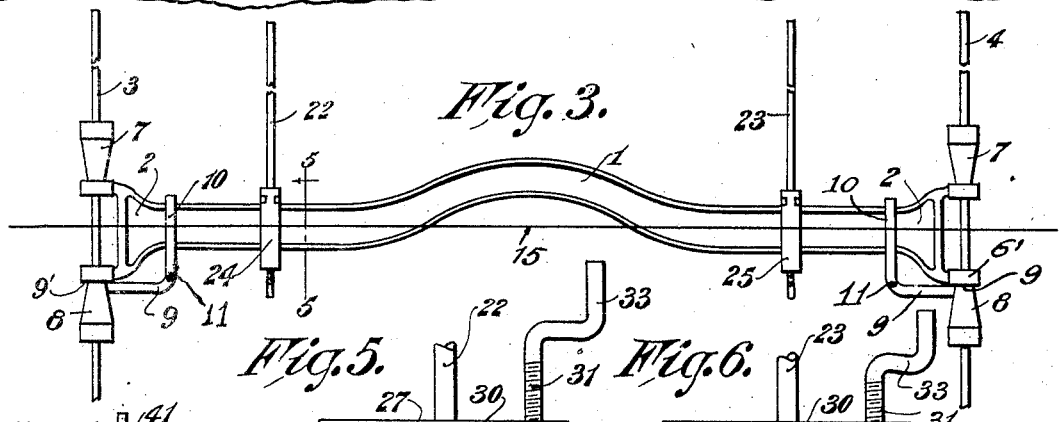
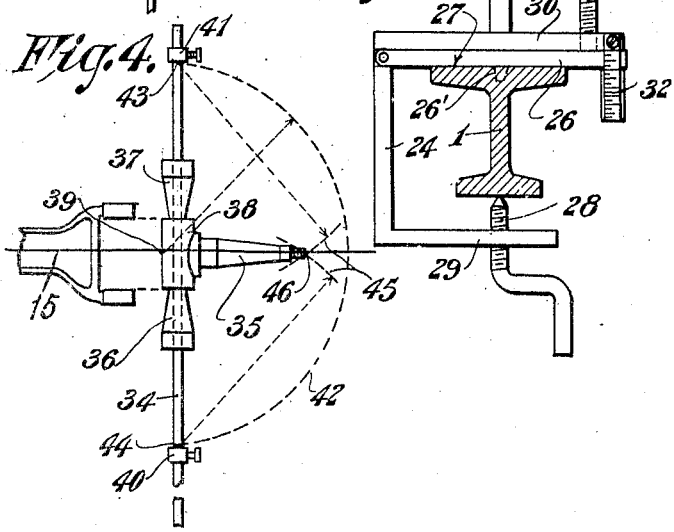
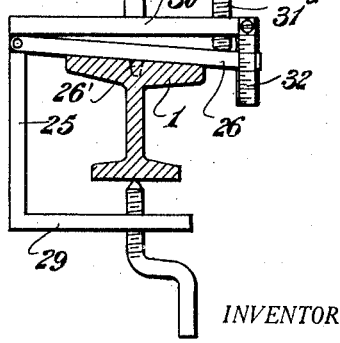
INVENTOR.  
*Burt W. Decatur,*  
BY  
*Harry W. Bowen.*  
ATTORNEY.

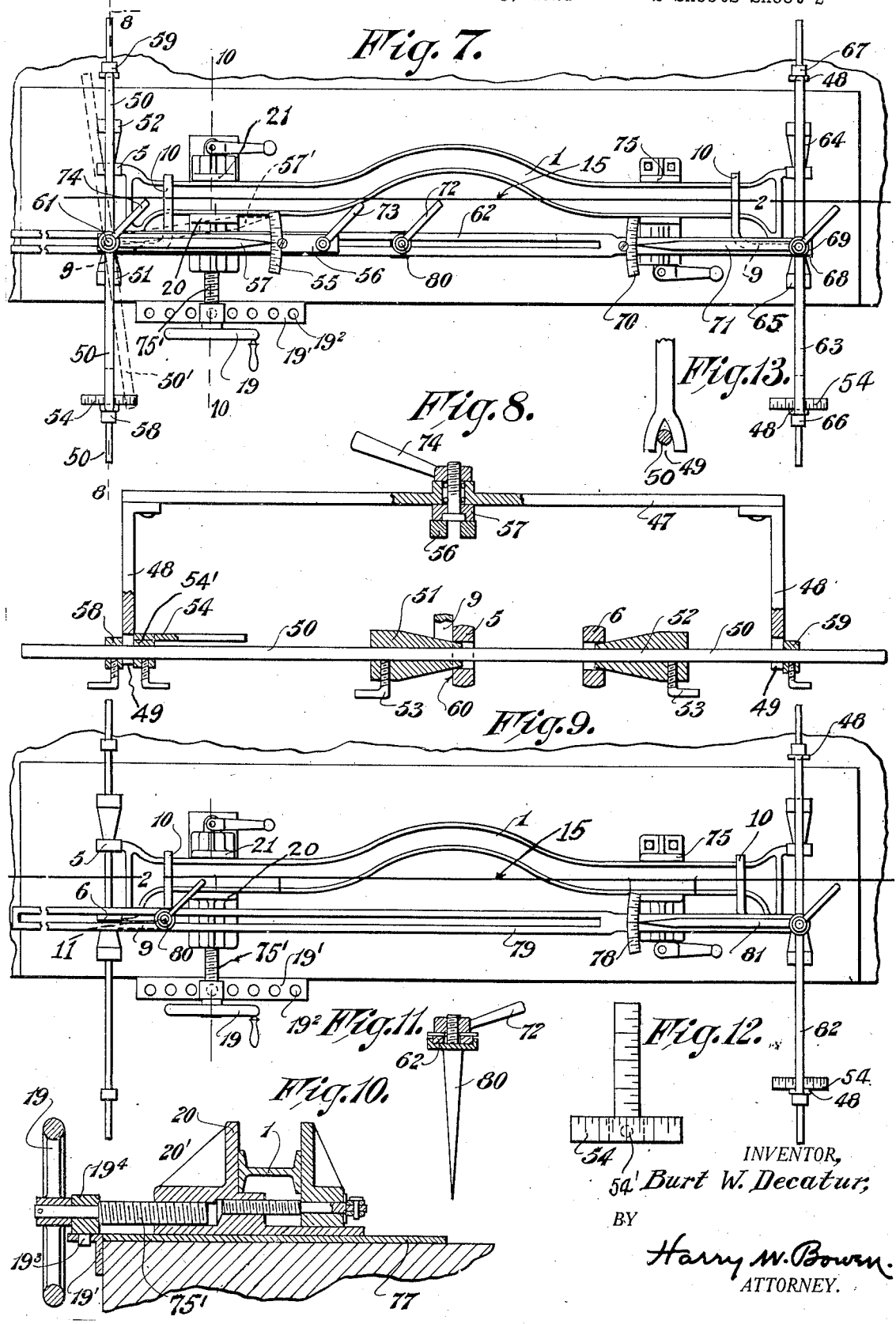

Patented Sept. 7, 1926.

1,598,713

UNITED STATES PATENT OFFICE.

BURT W. DECATUR, OF SPRINGFIELD, MASSACHUSETTS.

DEVICE FOR INDICATING AXLE DISTORTION.

Application filed June 8, 1921. Serial No. 475,957.

This invention relates to improvements in implements or devices for straightening axles, and for determining whether or not an axle is distorted. The invention relates particularly to axles that are used on motor vehicles, which are oftentimes distorted or twisted by accidents, heavy loads, or various other causes.

An object of the invention is to provide an implement which may be used to determine the amount that the axle is twisted or bent out of shape when considered with reference to both vertical and horizontal planes. It is a well known fact that in straightening or bringing an axle of an automobile back into its original position it is often hard to determine whether or not it is straight in all directions.

Broadly considered, one form of my invention comprises a device which is to be placed near the opposite ends of the axle, and which is provided with cones which fit the openings in the flanges which receive the hub of the wheel spindles, or knuckles, and means for engaging these devices, whereby the distortion of the axle may be readily determined, during the straightening operations.

A further object of the invention is to provide a clamp or vise for engaging opposite sides of the axle at the point where the same is twisted or bent to restore it to its original shape by placing pressure thereon.

A further object is in the provision of an attachment that is to be clamped to the upper and lower surfaces of the axle for determining the amount of twist of the same.

A further object to to provide a device for determining whether or not the stub or axle shaft on which the wheel is placed is out of alignment.

Referring to the drawings:

Fig. 1 is a plan view of an axle showing the rod devices that are located in the openings of the forks at the end of the axle; also the gage rod resting on one of rod devices and engaging the other rod device; also showing the clamping or vise devices for holding and exerting pressure on the axle at the point at which the axle is to be straightened.

Fig. 2 is a side or edge elevational view of Fig. 1.

Fig. 3 is a plan view showing the rods attached to the axle in addition to the gage rods, for the purpose of sighting from one end of the axle to the other for determining whether or not the axle is twisted.

Fig. 4 is a detail view showing the devices for determining whether or not the stub on which the wheel turns or revolves is in alignment with the axle.

Fig. 5 is a detail view of a gage device which is used in connection with the structure shown in Fig. 3, for determining the twist or distortion of the axle.

Fig. 6 is a view similar to Fig. 5 but showing the same attached to an axle in which the surface for the spring seat is inclined.

Fig. 7 is a plan view showing a modification of the implement, comprising two gage rods having a scale attached to each for determining the amount of twist or distortion at both ends of the axle which may be examined at the same time.

Fig. 8 is a side elevational view partially in section on the line 8—8 of Fig. 7, showing one of the implements for engaging one of the rods which is located in the fork of the axle.

Fig. 9 is a view similar to Fig. 7 showing the use of only one of the gage scales.

Fig. 10 is a detail sectional view of the vise or clamp, on the line 10—10 of Fig. 7 for exerting pressure to remove the distortion of the axle.

Fig. 11 is a detail view of one of the center points showing the means of adjusting and clamping the same onto the measuring or gage rod.

Fig. 12 is a detail view of one of the scales which is attached to the rods which are placed in the yokes of the axles, and Fig. 13 is a detail view of the V-shaped end of the implement for engaging the gage rod in the fork.

Referring to the drawings in detail: 1 indicates the front axle of a motor vehicle having the usual fork construction 2 at its ends in which is located the spindle on which the wheel turns. It is to be assumed that the original shape of the axle 1 has been distorted or twisted, and it is desired to locate the distortion and the extent of the same. The device or apparatus for detecting the distortion includes the rods 3 and 4 which are placed in the openings 5 and 6 in the forked ends. Slidably located on each of these rods are the cone shaped pieces 7 and 8 which enter the openings 5 and 6 in the flanges of the forks 2. These serve to accurately center the rods 3 and 4. Attached to the cone 8 at the left of Fig. 1, is the short rod 9 having the offset portion 10 which rests upon the axle, as shown, see Fig. 3, when the cone is turned on the rod 3 and clamped thereto by the set screw 8'. Located at the intersection of the parts 9 and 10 is an offset arm in which is a depression 11 (see Figs. 2 and 3). This depression is for the purpose of receiving the centering member 12 which is adjustably attached to the compass bar or rod 13 by means of the clamping construction 14 through which the centering member 12 passes, as clearly shown in Figs. 1 and 2. The clamp comprises an eye to receive the rod 13 and a nut proper for adjustably securing the member 12 thereon. The depression 11 in the part 9, it should be noticed, is laterally set off or spaced from the center line 15 of the axle and is in line with the vertical plane of the outer surfaces 9' of the flanges 6 of the forks, see Figs. 1 and 3. The centering member 12 is therefore set off or spaced this distance from the center line 15 of the axle in order that the operator may know when the axle is correctly straightened. In case the axle 1 is distorted or bent from the line 15 when considered in the plane of the paper, the adjustable point 16 on the opposite end of the rod 13 would strike the rod 4 at equal distances from the shoulder 17 of the collar 6 in the right hand fork 2, as clearly indicated by the dotted line 13'. The points 4' and 4⁴ on the rod 4 are equal distances from a line offset from the center line 15 a distance equal to that from the depression 11 to the center line 15 where it intersects the rod 4 at 4⁴.

After heating the axle at or near the distorted portion, for instance at 18, and placing the other end of the same in a fixed clamp or vise, indicated at 18' which engages the opposite sides of the axle, then placing a movable vise at or near the part 18, then rotating the hand wheel 19, the vise 20' as a whole is moved along on the fixed plate 77 (see Fig. 10), it being understood that the axle 1 is first clamped between the jaws 20 and 21. By means of the screw 75' the axle can be restored to its original shape which will be definitely determined when the point 16 on the rod 13 strikes the opposite ends of the rod 4 at the points 4' and 4⁴. The distance of the point 4⁴ from the center line 15 will then be equal to the distance of the point 4' from the point where the center line 15 intersects the rod 4 at 4³. 19' is a plate secured to the bench or other fixed support and formed with openings 19² to receive the lug 19³ on the block 19⁴, see Fig. 10. It will therefore be seen that when the wheel 19 is rotated the vise 20' and axle 1 will be moved along the plate 77 and the axle straightened. The vise shown in Fig. 10 comprises the clamping jaws 20 and 21, a base piece 20' having a threaded opening to receive the threaded rod 75' to which the hand wheel 19 is attached, which is actuated by the hand wheel for moving the jaws 20 and 21 towards each other to clamp the axle. When the hand wheel 19 is rotated the jaws 20 and 21 and axle 1 will slide on the fixed plate 77. This operation will straighten the axle in its own plane. If the axle is bent out of its plane it is straightened by placing one end in a vise, and after heating the axle it is twisted by applying a wrench to the axle. When the twist is removed it would be clearly shown by sighting along the rods 3, 22, 23, and 4. Meanwhile the rod 13 is employed to indicate to the workman when the distortion is removed, which would be when the point 16 engages the rod 4 as stated above, at 4' and 4². In case the axle is bent or distorted at different portions of its length the clamping jaws 20 and 21 are applied as before and the center line of the axle is brought back to its original position.

Referring now to Fig. 3, in which it is assumed that the axle, instead of being bent transversely of the line 15, is distorted or twisted about the axial line or out of its own plane. In order to determine the amount of twist, the rods 3 and 4 are placed as before in the openings of the forks 2. Also attached to the axle are the rods 22 and 23, by means of the clamps 24 and 25. By sighting lengthwise of the axle, the rods 3, 22, 23, and 4 will be in the same vertical plane if the axle is not twisted. If the axle is twisted, the rods will be out of alignment. In order to determine how much the axle is twisted, the device shown in Figs. 5 and 6 is employed. It comprises a bar 26 that is placed across the upper surface 27 of the axle at the point where the spring seat or chair is placed. The clamp 24 is held in position on the shaft, by means of the set screw 28 which is threaded through an arm 29 and engages the lower side of the axle. The bar 26 is formed with a projection 26' which enters an opening in the top of the axle where the forward spring is positioned. Threaded through the bar 30 is a rod 31 which engages the upper surface of the bar 26. Attached to the bar 30 is a scale 32, whereby when the crank arm 33 is rotated, the bar 30 will be elevated, and the rod 22 tipped, thereby bringing the same into line with the rods 3, 23, and 4. It should be stated that the parts 29, 24, and 30 form a rigid frame structure which is placed on the axle, as shown. If the upper and lower surfaces of the axle are parallel, as shown in Fig. 5, the bar 30 will engage the bar 26, and the scale 32 will not show any angular relation between the bars 26 and 30. The rod 22 will therefore lie in the same plane as the rods 3 and 4. If the upper and lower surfaces of the axle are at an angle to each other, as shown in Fig. 6, the bar 26 will fall onto the inclined surface, and the scale 32 will indicate the angular relation between these surfaces. The rod 23, will, of course, stand at right angles to the bar 30, because this bar is always rigidly attached to the clamps 25 and 24. The purpose therefore, of pivoting the bar 26 is to use the device on all kinds of axles; that is to say, on axles in which the upper and lower surfaces are either parallel or inclined toward each other.

Fig. 6 is a construction similar to Fig. 5, with the exception that the upper surface of the axle is inclined with respect to the lower surface. By clamping the axle in a vise after the same is heated, the twist or distortion may be removed by applying a wrench so that the axle stands in the same plane which is determined by sighting along the rods 3, 22, 23, and 4, as already described. In this way the distortion can be accurately corrected. By employing the devices shown in Figs. 1, 2, 3, 5, and 6 it is possible to restore the axle to its original position whether it is bent transversely of the center 15 or twisted about said line.

Fig. 4 is a modification for indicating any distortion of the spindle on which the wheel turns. In this construction a rod 34 is passed through the hub 38 of the spindle 35. 36 and 37 are cones on the rod 34 which enter the openings in the hub. By placing one leg of a compass at the point 39 on the center line 15 the positions of the inner edges of the collars 40 and 41 are located or spaced equal distances from this center line of the spindle, as indicated by the dotted line 42. Now by placing one leg of the compass successively at the points 43 and 44 on the collars 40 and 41 the arcs 45 are struck, and if they intersect at one point with the center line 15 of the spindle 35, as indicated at 46, it is clear that the axial line of the spindle 35 is accurately adjusted.

Referring now to the construction shown in Figs. 7 and 8, 47 designates a bar having the depending members 48 attached to its opposite ends. These members are forked or notched at 49 to receive the rod 50 as shown in Fig. 13. This rod, like the rods 3 and 4, is provided with the slidable cones 51 and 52, which are secured in place on the rod by means of the set screws 53 and enter the openings in the forks 5 and 6. Attached to the rod 50 is the scale 54 by means of the collar 58 (see Fig. 8). Attached to the cone 51 is an arm 9, as shown in Figs. 1, 2, 3, 7, 8, and 9. This arm is provided with a recess 11 and forms a support for the center pins 12, 61, and 80. 55 designates a scale which is secured to the bar 56 by means of the clamping lever 74 over which moves the pointer 57 which is attached to the rod 50 and therefore moves with the same. If the axle is distorted or bent, the pointer 57 will assume a position at one side of the zero part of the scale, as indicated by the dotted lines at 57' and 50', see Fig. 7. Mounted on the rod 50 are the adjustable collars 58 and 59. These collars are positioned at equal distances from the surface 60 of the flange 5, (see Fig. 8) whereby when any one of the center points 12, 61 or 80 is placed on the arm 9, in the manner shown in Figs. 1 and 2, the distortion of the axle may be at once detected by the pointer 57 with relation to the scale 55 as already described. The bar 56 slides on the slotted bar 62, which, as shown, is connected to the rod 63. This rod, like the rod 50 is provided with cones 64 and 65 which enter the openings in the flanges of the yoke part of the axle. On the rod 63 are the adjustable collars 66 and 67. These collars are spaced equal distances from the outer surface 68 of the flange 69. Scale 70 is attached to the bar 62 and a pointer 71 is connected to a bar like 47, whereby when two of the bars, like the bar 47 are placed on the rods 50 and 63, the two ends of the axle may be simultaneously tested for any distortion by referring to the pointers 57 and 71 with reference to the scales 55 and 70. 72, 73, and 74 designate clamping levers for the bars 56 and 62.

In order to restore the axle to its original shape, the operator heats the same in a suitable forge or flame. It is then clamped in the vise indicated in Fig. 10 for applying pressure to the axle, in the manner indicated in Fig. 1, whereby the axle is moved on the plate 77. Meanwhile the pointers 57 and 71 are observed, to determine when the axle is restored to its normal or straight condition. Any twist or spiral condition of the axle is determined by means of the devices shown in Figs. 3, 5, and 6, as already described.

The outer vertical surfaces of the flanges 5 and 6 of the yokes 2 may be considered a base line or plane from which the distortion or correction is determined by means of the implements already described in connection with Figs. 1, 2, and 3.

Referring to Fig. 9, which shows a device for measuring the distortion at one end only of the axle, in this figure but one scale 78 is used. The bar 79 is slotted, as shown, to receive the center pin 80, which is placed in the recess 11 on the arm 9, as before described. The scale 78 is secured to this bar. A pointer 81 moves over the scale 78, whereby the distortion of one end of the axle may be determined.

Referring again to Fig. 2, it will be noticed that a scale 81' is attached to the center point 12, which also serves as a handle, to move the rod 13 back and forth when it is operated, as indicated by the arrows 12' and 12². The distance of the pivotal point of 12 to its supporting end 11 is equal to the outer edge of the arc of the scale 81'. The handle will oscillate about its pivotal support 11 and the rod 13 will be drawn either towards the right or left hand, depending upon the direction of the movement of the handle 12. When this handle is moved, the scale 81' moves with it, and swings or moves over the upper surface of the rod 13; the extent of movement being indicated by the graduation on this scale. At the same time the point 8 moves over the scale 54 (see Fig. 1). This scale is provided with a collar having an opening 54' to receive either of the rods 4, 63, or 82. This construction and arrangement permits the operator to determine whether or not the axle is properly straightened or adjusted without its being necessary to swing the bar 13 back and forth or into the dotted line position 13'. It is accomplished by the operator noting on either the scale 54 or 81' how many divisions the scale is away from the center position. The operator now moves the second or adjustable point 13³ a distance from the fixed point 13² equal to one half of the reading on the scale 54. Therefore, when the axle is bent during the straightening process, or brought back so that the point 13³ coincides with the center line of the scale 54 the axle will be straight. By reason of the distance of the pivotal point 14 of the hand lever 12 being an equal distance from its pivotal end 11 and from the outer curved edge of the scale 81', the indication of the movement of the rod 13 will be equal to the movement of the handle 12. This construction also permits the operator to set his gage in advance, and when the axle is straight the readings will be on the zero position of either scale 54 or 81'.

What I claim is:

1. In combination, a device for locating and detecting the distortion in an automobile axle, rods adapted to be placed in the openings of the flanges of the forks at both of the ends of the axle, means comprising slidable cones on the rods for centering the rods in the openings of the flanges, a compass bar, means for supporting the compass bar at one of its ends on one of said rods, said bar having a swinging movement for intersecting the rod in the openings in the flanges at the other end of the axle, whereby the distortion of the axle in one plane may be detected, as described.

2. A device for detecting distortion in an axle or the like, and comprising, in combination, a rod, means thereon for centering it in each of the openings of the flanges of the forks at the opposite ends of the axle, a compass bar, means for supporting the compass bar on one of said centered rods at a definite distance from the center line of the axle, and having its other end engaging the rod in the other flanges, when an arc is struck by the compass bar that is supported on one rod and its end intersects the other rod it will determine any lateral distortion of the axle when considered with reference to the center line of the axle.

3. An automobile axle testing device comprising two rods designed for insertion in the aligned openings of the two flanges at the opposite ends of the axle, slidable cones on the rods for centering the rods in the openings, one of the cones having an offset arm attached thereto with a depression therein, a compass bar, a center pin thereon for entering the depression, a marking pin at its other end, the compass bar being of a length sufficient to intersect to the rod which is located in the openings of the flanges at the other end of the axle, said bar when swung about the center pin will cause the marking pin to intersect or engage the second rod, the points of intersection serving to determine the distortion of the axle with reference to the center line of the axle.

4. In combination, rods designed to be located in the vertical spindle openings of the forks of an automobile axle, means on the rods for centering the rods when located in the said openings, a compass bar, an arm on one of the rods for pivotally supporting one end of said bar on one of the rods, a scale on the other rod, a pin on the compass bar designed to move over the scale for determining the distortion of said axle about its axial line and in the plane of the axle.

5. A device for indicating the distortion of the front axle of a motor vehicle comprising in combination with the axle, rods located in openings at the fork ends of the axle, cones on the rods for entering the openings for centering the rods in the openings, means pivotally located with reference to one of the rods in the openings and its opposite end which is movable over the other rod in the openings whereby the points of intersection of the said opposite end of the means with the other rod and with reference to the axial line of the axle will indicate the distortion of the axle.

6. In a distortion indication device for the front axle of a motor vehicle, in combination, rods adapted to be inserted in the openings at the ends of the axle, a scale on one of the rods, a beam movably supported at one end on the other rod, for movement substantially parallel with the axle, the other end of the beam having a finger which moves over the scale whereby the distortion of the axle from its median or center line, may be determined with reference of the finger movements over the scale.

7. In a device for determining the distortion of the front axle of a motor vehicle, in combination, rods adapted to be inserted in the openings at the fork ends of the axle, means for centering the rods in the openings, means for pivotally supporting one end of a bar on one of the rods, the other end of said bar being designed to swing over the rod at the other end of the axle and intersect the same, whereby the points of intersection of the other rod with reference to the center line of the axle will indicate its distortion.

BURT W. DECATUR.